US012312846B2

(12) United States Patent
Rechberg et al.

(10) Patent No.: US 12,312,846 B2
(45) Date of Patent: May 27, 2025

(54) DOOR LOCKING MECHANISM

(71) Applicant: Actron Manufacturing, Inc., Corona, CA (US)

(72) Inventors: Frank H. Rechberg, Corona, CA (US); Jason A. Rechberg, Corona, CA (US)

(73) Assignee: Actron Manufacturing, Inc., Corona, CA (US)

( * ) Notice: Subject to any disclaimer, the term of this patent is extended or adjusted under 35 U.S.C. 154(b) by 175 days.

(21) Appl. No.: 18/157,606

(22) Filed: Jan. 20, 2023

(65) Prior Publication Data

US 2023/0250681 A1 Aug. 10, 2023

Related U.S. Application Data

(60) Provisional application No. 63/267,639, filed on Feb. 7, 2022.

(51) Int. Cl.
*E05C 9/24* (2006.01)
*E05C 9/04* (2006.01)
*E05C 9/18* (2006.01)

(52) U.S. Cl.
CPC .................. *E05C 9/24* (2013.01); *E05C 9/04* (2013.01); *E05C 9/1841* (2013.01)

(58) Field of Classification Search
None
See application file for complete search history.

(56) References Cited

U.S. PATENT DOCUMENTS 993,235 A * 5/1911 Friedman ................ E05C 9/045 292/37
1,909,697 A * 5/1933 MacBeth .............. E05B 13/004 292/164
5,570,913 A * 11/1996 Puric .................. E05B 63/0017 292/37
7,350,383 B1 * 4/2008 Kuo ........................ E05B 63/20 70/279.1
7,410,195 B1 * 8/2008 Martin ...................... E05C 7/06 292/DIG. 21
2023/0063848 A1 * 3/2023 Beardmore ......... E05B 65/0035

FOREIGN PATENT DOCUMENTS

WO WO-9943915 A1 * 9/1999 ......... E05B 47/0038

* cited by examiner

*Primary Examiner* — Kristina R Fulton
*Assistant Examiner* — Christopher F Callahan
(74) *Attorney, Agent, or Firm* — Stetina Garred Brucker & Newboles

(57) ABSTRACT

A door locking mechanism includes a main body, a trigger, and a slide lock. The slide lock and the main body are configured such that at least a portion of the slide lock extends outside of the main body in a locked position, with the slide lock being advanced into the main body as the slide lock transitions toward an unlocked position. A ball lock is in operative communication with the trigger and the slide lock, with the ball lock, the trigger, and the slide lock being configured such that when the trigger is in the extended position, the ball lock inhibits movement of the slide lock from the unlocked position toward the locked position. Movement of the trigger from an extended position toward a retracted position allows the ball lock to assume an unobstructed position allowing the slide lock to transition from toward the locked position.

9 Claims, 6 Drawing Sheets

DOOR LOCKING MECHANISM

CROSS-REFERENCE TO RELATED APPLICATIONS

This application claims the benefit of U.S. Application Ser. No. 63/267,639, filed Feb. 7, 2022, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a door lock, and more specifically, to a door lock configured to inhibit movement of an extendable locking portion from a retracted position to an extended position until the door is closed to protect against damage to the door frame and/or the door lock itself.

2. Description of the Related Art

Many doors include a deadbolt-type of locking mechanism incorporated therein to enhance the overall security of the door. A typical deadbolt lock includes an extendable portion that may be retracted within the door to allow the door to freely pivot relative to the frame to which the door is attached. When the door is closed, the deadbolt may be transitioned from its retracted position to an extended position to be received within an opening formed within the door frame. Thus, when the bolt is extended from the door to the frame, the bolt may prevent the door from being opened. When a user wants to open the door, the bolt may be transitioned from its extended position to a retracted position. Once the bolt is retracted within the door, the door may be moved from its closed position toward its open position.

Deadbolt-type locking mechanisms may be incorporated into conventional, single-panel doors, as well as more specialized doors, such as multi-panel doors. An example of a multi-panel door is a conventional lavatory door on an airplane. The multi-panel configuration of an airplane lavatory door may be suitable for the limited space available in an airplane.

Although deadbolt-type locking mechanisms may be effective at locking a door when extended through the associated frame, there may be drawbacks or deficiencies associated with deadbolt-type locks. One common deficiency is that conventional deadbolt locks lack built-in safety mechanisms that prevent premature transition of the deadbolt to its extended position prior to the door being positioned in its completely closed configuration. When the deadbolt is extended prior to the door being closed, the deadbolt may cause damage to the frame, the door, or to the deadbolt itself if the door is subsequently moved toward its closed position. In particular, the extended deadbolt may be moved with force into contact with the frame. If the force is sufficient, the contact may cause damage.

Accordingly, there is a need in the art for an improved door locking mechanism specifically configured and adapted to inhibit extension of a deadbolt until an associated door is in a closed position. Various aspects of the present disclosure address this particular need, as will be discussed in more detail below.

BRIEF SUMMARY

In accordance with one embodiment of the present disclosure, there is provided a door locking mechanism including a main body. A trigger is coupled to the main body and is moveable relative to the main body between an extended position and a retracted position. The trigger and the main body are configured such that at least a portion of the trigger extends outside of the main body when the trigger is in the extended position, and the trigger is advanced into the main body as the trigger transitions from the extended position toward the retracted position. A slide lock is coupled to the main body and is moveable relative to the main body between a locked position and an unlocked position. The slide lock and the main body are configured such that at least a portion of the slide lock extends outside of the main body when the slide lock is in the locked position, with the slide lock being advanced into the main body as the slide lock transitions from the locked position toward the unlocked position. A ball lock is in operative communication with the trigger and the slide lock, with the ball lock, the trigger, and the slide lock being configured such that when the trigger is in the extended position, the ball lock inhibits movement of the slide lock from the unlocked position toward the locked position. Movement of the trigger from the extended position toward the retracted position allows the ball lock to assume an unobstructed position which allows the slide lock to transition from the unlocked position toward the locked position.

The door locking mechanism may additionally include an auxiliary slide mechanism configured to be moveable relative to the main body in a direction that differs from movement of the slide lock relative to the main body. The auxiliary slide mechanism may be moveable relative to the main body generally perpendicular to movement of the slide lock relative to the main body.

The door locking mechanism may further include a pivot body pivotally connected to the main body and interconnected to the slide lock and the auxiliary slide mechanism. The pivot body may include a first slot and the slide lock may include a first pin configured to move within the first slot as the slide lock moves relative to the pivot body. The pivot body may include a second slot, separate from the first slot, and the auxiliary slide mechanism includes a second pin configured to move within the second slot as the auxiliary slide mechanism moves relative to the pivot body.

The door locking mechanism may include a spring positioned so as to act on the trigger to bias the trigger toward the extended position.

The slide lock may include a first edge adjacent the trigger and a recess may extend into the slide lock from the first edge. The recess may be complementary in shape to an outer periphery of the ball lock such that the ball lock is receivable within the recess when the slide lock is in the unlocked position.

The trigger may include a pair of enlarged portions and an intermediate portion between the pair of enlarged portions, with the intermediate portion having a cross sectional dimension less than a cross sectional dimension of each of the pair of enlarged portions.

The door locking mechanism may be configured such that when the slide lock is in the unlocked position, the ball lock is captured within a recess formed in the slide lock and extends between the slide lock and one of the pair of enlarged portions. Transition of the trigger from the extended position to the retracted position may moves the intermediate portion into alignment with the ball lock, thereby allowing the ball lock to move out of the recess. The door locking mechanism may include a handle connected to the slide lock.

According to another embodiment, there is provided a door locking mechanism including a main body, and a trigger coupled to the main body and moveable relative to the main body along a trigger axis. A slide lock is coupled to the main body and moveable relative to the main body along a slide lock axis between a locked position and an unlocked position. The slide lock defines a retracted portion as that portion of the slide lock being located within the main body, with the retracted portion increasing in size as the slide lock transitions from the locked position to the unlocked position. A ball lock is in operative communication with the trigger and the slide lock. When the slide lock is in the unlocked position, the ball lock is captured within a recess formed in the slide lock and the ball lock extends between the slide lock and one of the pair of enlarged portions. Transition of the trigger from the extended position to the retracted position allows the ball lock to move out of the recess.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a door locking mechanism and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure relate to a door locking mechanism specifically configured and adapted to prevent transition of the door locking mechanism from a retracted, unlock configuration toward an extended, lock configuration, until the associated door is fully closed. In this regard, the door locking mechanism includes a slide lock that extends outside of a main body when the door locking mechanism transitions from the unlock configuration toward the lock configuration. If the slide lock is extending outside of the main body prior to the door being closed, the extended slide lock may contact the door frame and cause damage to the door frame, the door locking mechanism, and/or the door if the door is being closed with sufficient force. As such, the door locking mechanism may be configured to maintain the slide lock in its retracted, unlocked position until the door is in the fully closed position. Only when the door is in the fully closed position may the slide lock become free to extend out of the main body and into a void in the door frame to assume the locked position.

Figure 1:
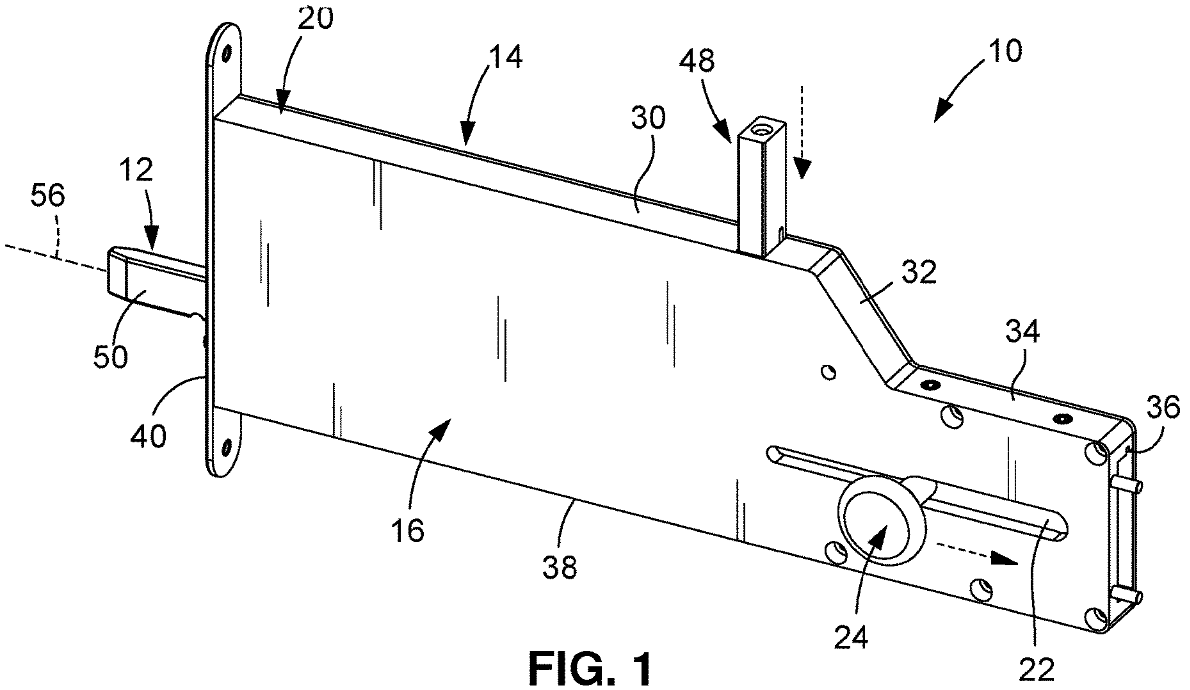
FIG. 1 is a first side, upper perspective view of a door locking mechanism in a lock configuration.
Figure 2:
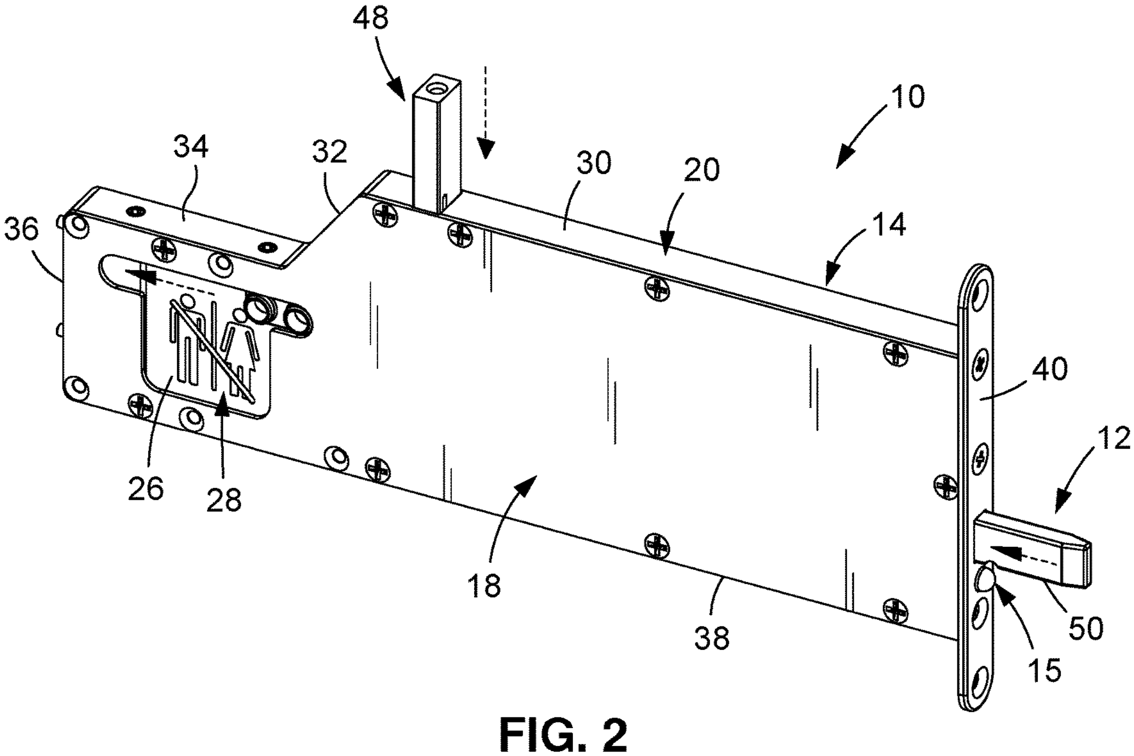
FIG. 2 is a second side, upper perspective view of the door locking mechanism in the lock configuration.
Figure 3:
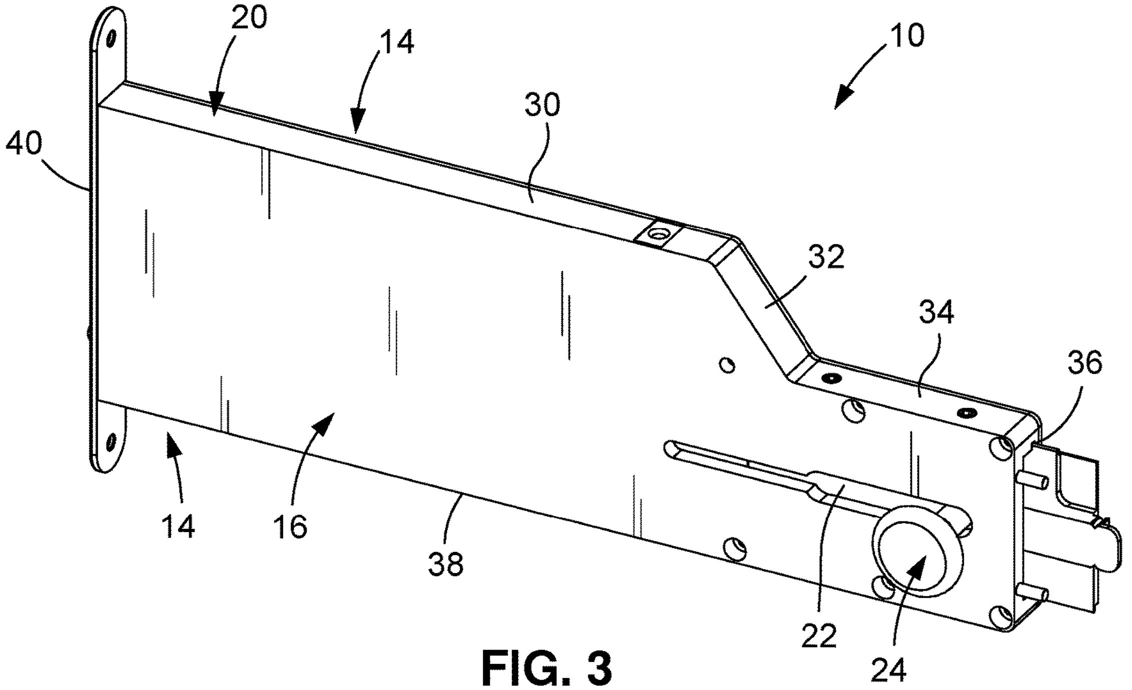
FIG. 3 is a first side, upper perspective view of the door locking mechanism in an unlock configuration.
Figure 4:
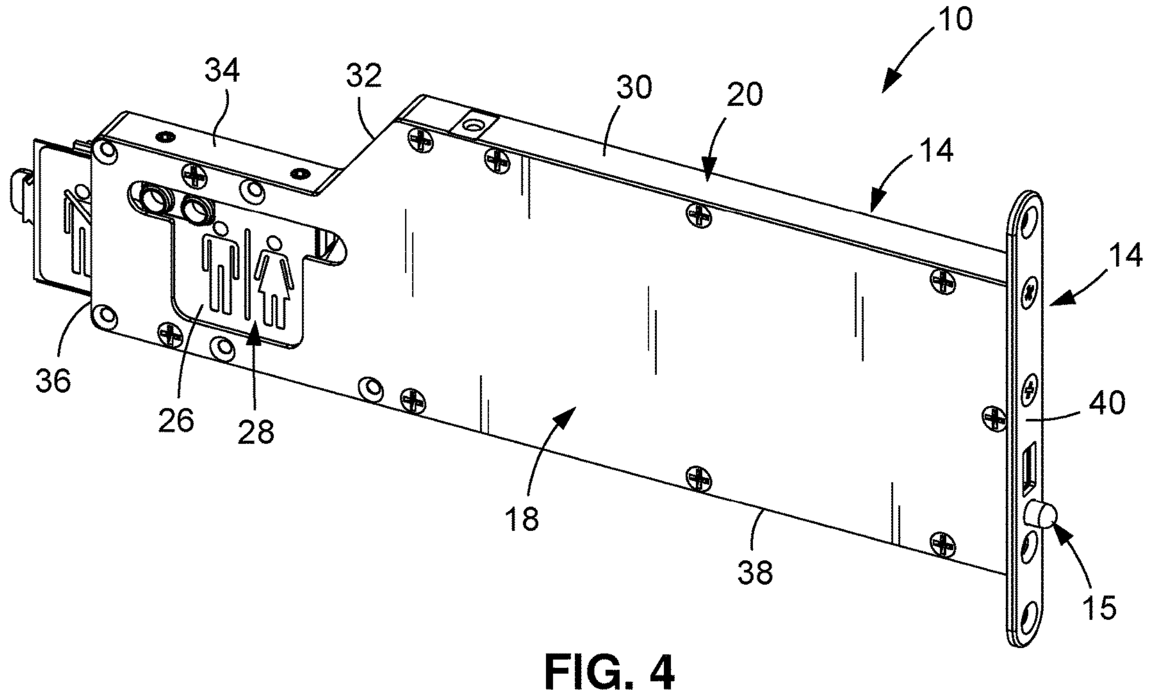
FIG. 4 is a second side, upper perspective view of the door locking mechanism in the unlock configuration.

Referring now specifically to FIGS. 1 and 2, upper perspective views are depicted of an exemplary embodiment of a door locking mechanism 10 in the locked position, e.g., with a portion of a slide lock 12 extending out of a main body 14. FIGS. 3 and 4 are counterpart upper perspective views of the door locking mechanism 10 in the unlocked position, e.g., with the slide lock 12 being retracted within a main body 14. The door locking mechanism 10 includes a trigger 15 configured to be disposable in contact with a door frame when the associated door is moved into a closed position. When the slide lock 12 is in an unlocked position, and the trigger 15 is extending outside of the main body 14, an operative interconnection between the slide lock 12 and the trigger 15 may inhibit movement of the slide lock 12 to the extended, locked position. However, as the door is closed, the trigger 15 may contact the door frame, which may cause the trigger 15 to slide into the main body 14 in response to such contact with the door frame. Through the operative interconnection between the trigger 15 and the slide lock 12, movement of the trigger 15 into the main body 14 may release the slide lock 12 and allow the slide lock 12 to extend out of the main body 14.

The main body 14 may be configured to be integrated into a panel of an existing door. In one particular implementation, the door locking mechanism 10 may be integrated into a bi-fold door for an aircraft lavatory. As such, the door locking mechanism 10 may be integrated into one of two panels forming the bi-fold door. However, it is contemplated that the door locking mechanism 10 may be integrated into other door systems, such as a single panel door, or a door having more than two panels, without departing from the spirit and scope of the present disclosure.

In the exemplary embodiment, the main body 14 includes a first side plate 16, an opposing second side plate 18 and a peripheral wall 20 extending between the first and second side plates 16, 18. The first side plate 16 may include a slot 22 to accommodate translation of a handle 24 relative to the main body 14, with the handle 24 being operatively coupled to the slide lock 12, as will be explained in more detail below. The second side plate 18 may include a window opening 26 which may be aligned with an occupied/unoccupied sign 28, as will be explained in the more detail below. The peripheral wall 20 may include a top segment 30, a ramp segment 32, an intermediate segment 34, an inner side segment 36, a bottom segment 38, and an outer side segment 40. The peripheral wall 20 may include several openings to accommodate movement of various components of the door locking mechanism 10, as will be explained in more detail below. The outer side segment 40 of the peripheral wall 20 may include one or more extensions or flanges which extend beyond the top segment 30 and the bottom segment 38 to facilitate attachment of the main body 14 to the host door panel.

Figure 5:
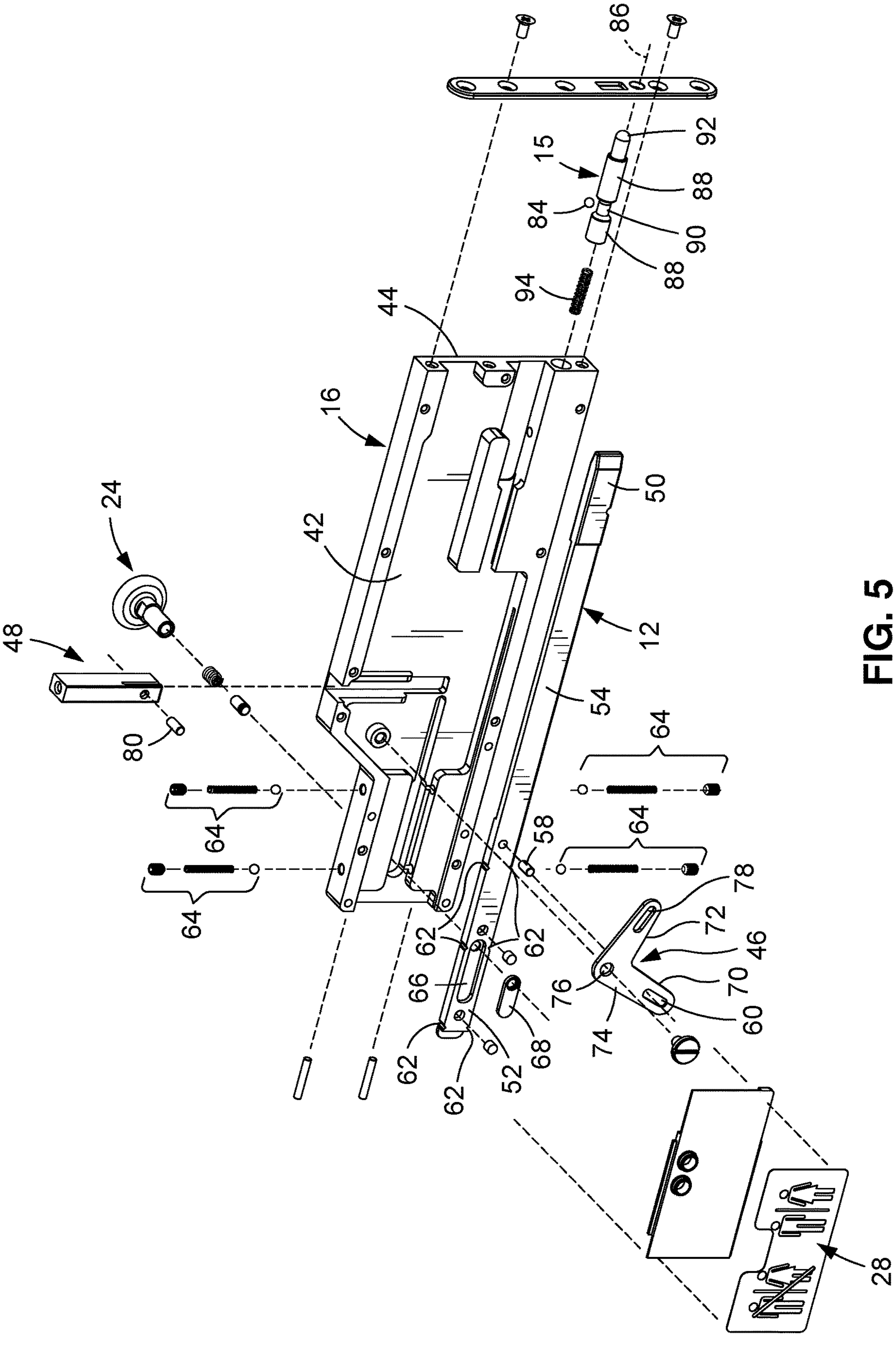
FIG. 5 is a second side, upper perspective exploded view of the door locking mechanism.
Figure 6:
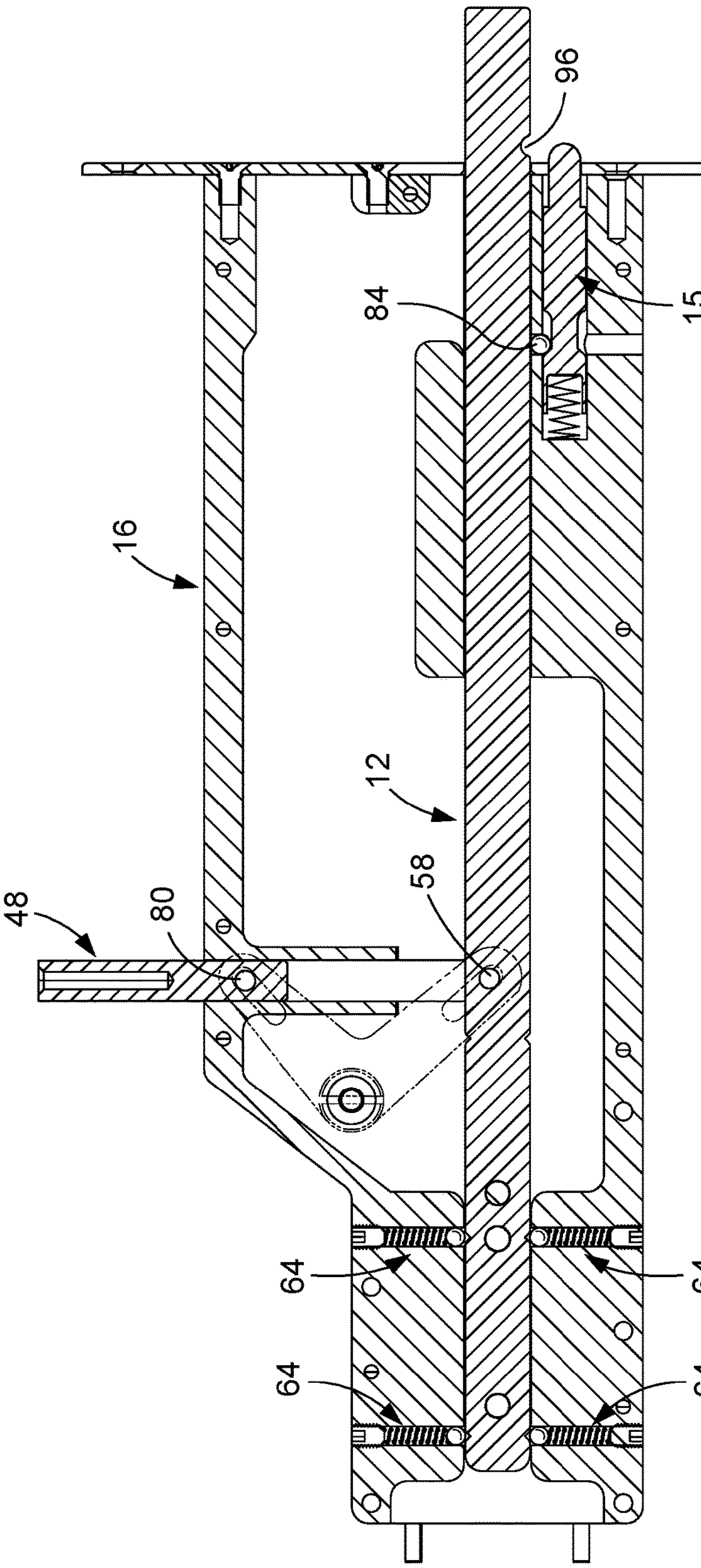
FIG. 6 is a cross sectional view of the door locking mechanism in the lock configuration.
Figure 7:
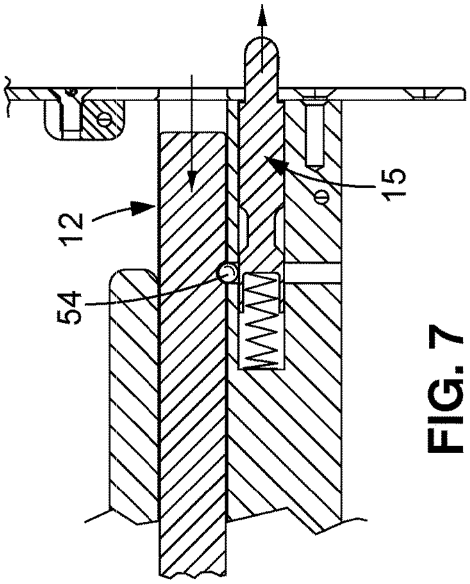
FIG. 7 is a partial cross sectional view of the door locking mechanism in the unlock configuration.
Figure 8:
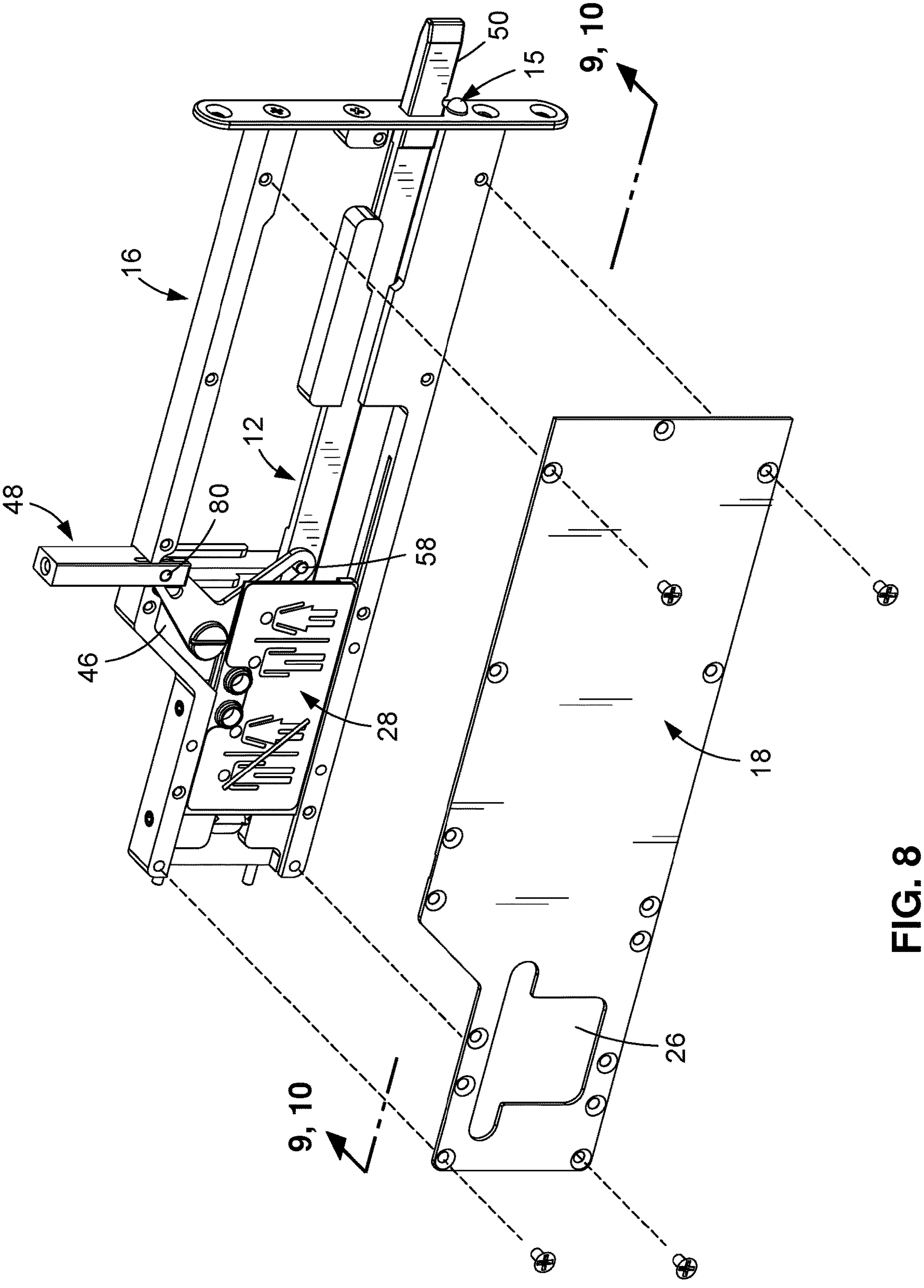
FIG. 8 is a second side, upper perspective view of the door locking mechanism in the lock configuration with an outer plate exploded therefrom to illustrate internal components of the door locking mechanism.

Referring now to FIG. 5, there is depicted a partial exploded view of the door locking mechanism 10 to illustrate internal components thereof, as well as the internal configuration of the main body 14. In the embodiment depicted in FIG. 5, the inside of the first side plate 16 is shown, with the first side plate 16 including an inside surface 42 and an opposing outer surface 44. The first side plate 16 may include a plurality of internal protuberances or formations extending from the inside surface 42, which may serve as support guides for internal components which may move relative to the first side plate 16. For instance, several internal protuberances may create a channel for supporting the slide lock 12, while another protuberance may support a pivot body 46, and still other protuberances support an auxiliary slide mechanism 48.

The slide lock 12 may include an elongate member or shaft having a first end portion 50, a second end portion 52, and an intermediate portion 54 extending between the first and second end portions 50, 52. The slide lock 12 may be moveable relative to the main body 14 along a slide lock axis 56 between the locked position and the unlocked position. The slide lock 12 and the main body 14 are configured such that at least a portion of the slide lock 12 (e.g., the first end portion 50) extends outside of the main body 14 when the slide lock 12 is in the locked position. The slide lock 12 may be advanced into the main body 14, with the first end portion 50 retreating into the main body 14, as the slide lock 12 transitions from the locked position toward the unlocked position.

As noted above, the first end portion 50 may be configured to extend out of the main body 14 when the slide lock 12 is moved to a locked position, such that the first end portion 50 is receivable in a channel or recess formed in a door frame when the door is in a closed position. The first end portion 50 may include a distal tip and a pair of angled faces extending from the distal tip. The angled faces may transition to a pair of side faces, which are generally parallel to each other and may define an enlarged thickness relative to the intermediate portion 54. It is contemplated that the first end portion 50 may have other configurations, such as substantially circular, oval, or quadrangular without departing from the spirit and scope of the present disclosure.

The intermediate portion 54 may include a pair of side faces generally parallel to each other and extending between the first end portion 50 and the second end portion 52. The intermediate portion 54 may include a pin 58 connected thereto adjacent the second end portion 52. The pin 58 may be received in a slot 60 formed in the pivot body 46, to coordinate movement of the pivot body 46 with movement of the slide lock 12, as will be explained in more detail below.

The second end portion 52 may include a plurality of grooves 62 extending in spaced relation to each other in a pair of surfaces (e.g., an upper surface and a lower surface), with the grooves extending in a transverse direction relative to the elongate direction of the slide lock 12, e.g., in a direction generally perpendicular to the longitudinal side faces of the slide lock 12. In the exemplary embodiment, the slide lock 12 includes three grooves 62 formed in an upper surface, and three grooves 62 formed in the lower surface, with each groove 62 in the upper surface being aligned with a corresponding groove 62 in the lower surface. The grooves 62 are configured to interface with two sets of spring biased detents 64 to provide a stop force or holding force when the slide lock 12 is in either the locked position or the unlocked position, as will be explained in more detail below. Each spring biased detent 64 may include a ball element and a spring which acts on the ball element to urge the ball element toward the slide lock 12.

The second end portion 54 may additionally include a slot 66 extending between opposed sidewalls thereof. The slot 66 is sized to receive a handle connector plate 68 operatively coupled to handle 24, with the handle connector plate 68 being adapted to translate within the slot 66. The ability of the handle connector plate 68 to move within the slot 66 may allow for limited relative motion between the handle 24 and the slide lock 12 without causing the slide lock 12 to move relative to the main body 14. Thus, if the handle 24 is inadvertently bumped or otherwise moved slightly, the slide lock 12 may not move relative to the main body 14. As such, the incorporation of the slot 66 within the slide lock 12 may ensure that movement of the slide lock 12 between its locked and unlocked positions occurs after deliberate, intended movement of the handle 24.

The door locking mechanism 10 may additionally include auxiliary slide mechanism 48 configured to be moveable relative to the main body 14 in a direction that differs from movement of the slide lock 12 relative to the main body 14. The auxiliary slide mechanism 48 may include a dedicated handle connected thereto which is grippable by a user to facilitate movement of the auxiliary slide mechanism 48 relative to the main body 14. The auxiliary slide mechanism 48 may be moveable relative to the main body 14 in a direction generally perpendicular to the direction of movement of the slide lock 12 relative to the main body 14. In one implementation, the slide lock 12 may be moveable in a generally horizontal direction and may traverse a plane defined by the outer side segment 40 of the peripheral wall 20, whereas the auxiliary slide mechanism 48 may be moveable in a generally vertical direction and may traverse a plane defined by the top segment 30 of the peripheral wall 20. Thus, a user may choose whether they want to operate the door locking mechanism 10 by moving the auxiliary slide mechanism 48 in a vertical direction, or the slide lock 12 in a horizontal direction. In other words, the auxiliary slide mechanism 48 and the slide lock 12 provide two different alternatives for users to interface with when operating the door locking mechanism 10.

According to one embodiment, the slide lock 12 and the auxiliary slide mechanism 48 are in operative communication with each other via pivot body 46. The pivot body 46 may be generally L-shaped and include a first arm 70 extending in a first direction and a second arm 72 extending in a second direction different from the first direction 70, with the first and second arms 70, 72 intersecting at an apex region 74. The apex region 74 may include an opening 76 formed therein, which receives a pivot shaft connectable to the main body 14. The first and second arms 70, 72 may be generally perpendicular to each other, although it is contemplated that the relative position of the first and second arms 70, 72 is not limited to being ninety degrees offset from each other. The pivot body 46 may include first slot 60 extending within the first arm 70 and second slot 78 extending in the second arm 72, with the first and second slots 60, 78 extending generally perpendicular to each other. As noted above, the first slot 60 may be adapted to receive pin 58 connected to the slide lock 12 and the second slot 78 may be adapted to receive a pin 80 connected to the auxiliary slide mechanism 48. The pivot body 46 interconnects the auxiliary slide mechanism 48 to the slide lock 12 to allow for movement of the slide lock 12 in concert with, or concurrently with, movement of the auxiliary slide mechanism 48. In one embodiment, movement of the auxiliary slide mechanism 48 in a downward direction (e.g., into the main body 14), may cause the pivot body 46 to pivot in a first rotational direction relative to the main body 14, which in turn, may cause the slide lock 12 to retract or retreat into the main body 14. Conversely, movement of the auxiliary slide mechanism 48 in an upward direction (e.g., out of the main body 14), may cause the pivot body 46 to pivot in a second rotational direction, opposite the first rotational direction, which in turn, may cause the slide lock 12 to extend out of the main body 14.

Thus, if a user decides to operate the door locking mechanism 10 via movement of the auxiliary slide mechanism 48 (rather than via slide lock 12/handle 24), the interconnection of the slide lock 12 and auxiliary slide mechanism 48 via the pivot body 46 allows the slide lock 12 to transition between the locked and unlocked positions via movement of the auxiliary slide mechanism 48.

As noted above, trigger 15 is operatively connected to the slide lock 12 to inhibit or restrict movement of the slide lock 12 from the unlocked position toward the locked position when the door is not yet completely closed. In one embodiment, the operative connection is facilitated through the use of a ball lock 84 adapted to interface with the slide lock 12 to restrict movement of the slide lock 12 from the unlocked position toward the locked position until the door is in a completely closed position. The trigger 15 is coupled to the main body 14 and is moveable relative to the main body 14 along a trigger axis 86. The main body may include a recess or chamber, through which the trigger axis 86 extends, to accommodate the trigger 15. In one particular embodiment, the trigger 15 may include a pair of enlarged portions 88 and an intermediate portion 90 between the pair of enlarged portions 88. The intermediate portion 90 may include a cross sectional dimension less than a cross sectional dimension of each of the pair of enlarged portions 88. In the exemplary embodiment, each enlarged portion 88 is cylindrical and includes an outer diameter greater than any outer diameter in the intermediate portion 90. The intermediate portion 90 may include a cylindrical segment disposed between two ramp segments, with each ramp segment extending from the cylindrical segment and the adjacent enlarged portion. The trigger 15 may additionally include a distal portion 92 extending from one of the enlarged portions, with the distal portion 92 having a rounded end region or a slanted end region adapted to interface with a strike plate on a door frame. The rounded or slanted configuration may allow the trigger 15 to slide over the strike plate when the door is closed and urge the trigger 15 into the main body 14. In this regard, the trigger 15 may be moveable relative to the main body 14 between an extended position and a retracted position. The door locking mechanism 10 may include a spring positioned so as to act on the trigger 15 to bias the trigger 15 toward the extended position.

The ball lock 84 is configured to be positioned between the slide lock 12 and the trigger 15 and is moveable to either restrict movement of the slide lock 12, or allow movement of the slide lock 12, depending on location of the trigger 15. The main body 14 may include an opening extending between an area or void which accommodates the slide lock, and a recess that accommodates the trigger 15. The opening may define a central axis, and the ball may be received within the opening and may be retained from moving in a direction that is generally perpendicular to the central axis. However, the ball may be able to float within the opening in a direction generally parallel to the central axis to facilitate the restricting or freeing of the slide lock 12.

The slide lock 12 may include a first edge adjacent the trigger 15 and a recess 96 may extend into the slide lock 12 from the first edge. The recess 96 may be complementary in shape to an outer periphery of the ball lock 84 such that the ball lock 84 is receiveable within the recess 96 when the slide lock 12 is in the unlocked position. In this regard, the diameter or curvature of the recess 96 may be sized to receive the ball lock 84 when the recess 96 is aligned with the ball lock 84 (e.g., when the recess 96 is aligned with the opening in which the ball lock 84 resides).

Figure 9:
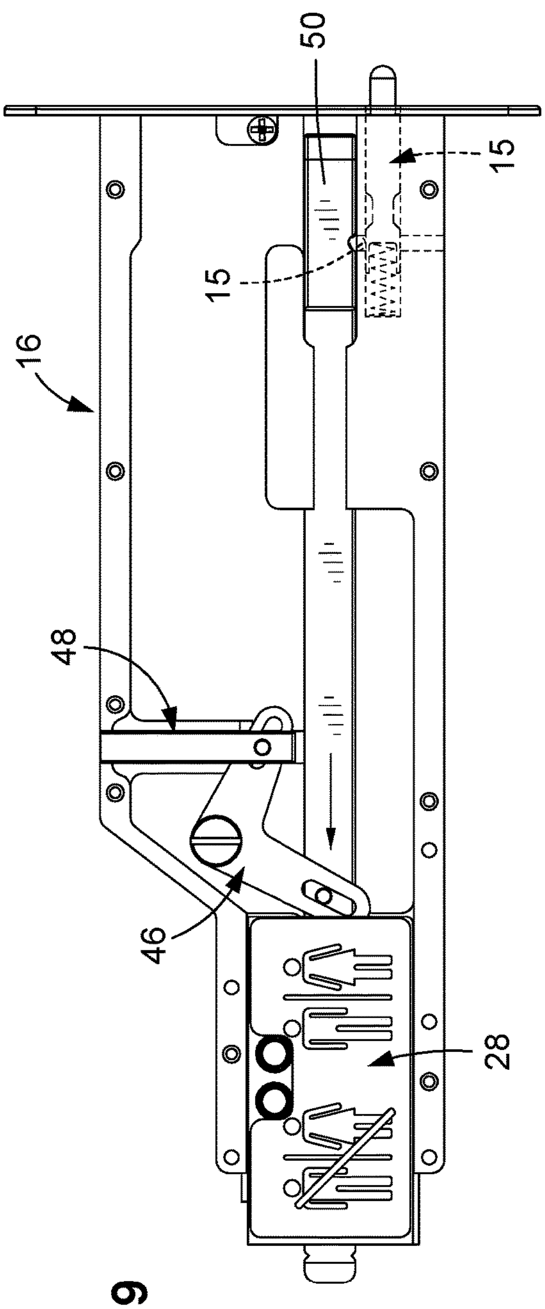
FIG. 9 is a side view of the door locking mechanism with an outer plate removed therefrom to illustrate internal components of the door locking mechanism in the unlocked configuration.

In use, with the door locking mechanism 10 in the unlocked configuration, as shown in FIG. 9, the trigger 15 is in its extended position, and the ball lock 84 is received in the recess 96 of the slide lock 12 and is prevented from moving in a direction parallel to movement of the slide lock 12 to restrict such movement of the slide lock 12 (e.g., movement of the slide lock 12 from the unlocked position toward the locked position). The movement of the ball lock 84 in the direction parallel to movement of the slide lock 12 is restricted by the main body 14. Thus, the ball lock 84 effectively prevents the slide lock 12 from moving from the unlocked position toward the locked position. When the slide lock 12 is in the unlocked position, the occupied/unoccupied sign 28 may be positioned relative to the window opening 26 with the unoccupied indicia on the sign 28 being exposed, and the occupied indicia on the sign 28 being concealed by the main body 14.

Figure 10:
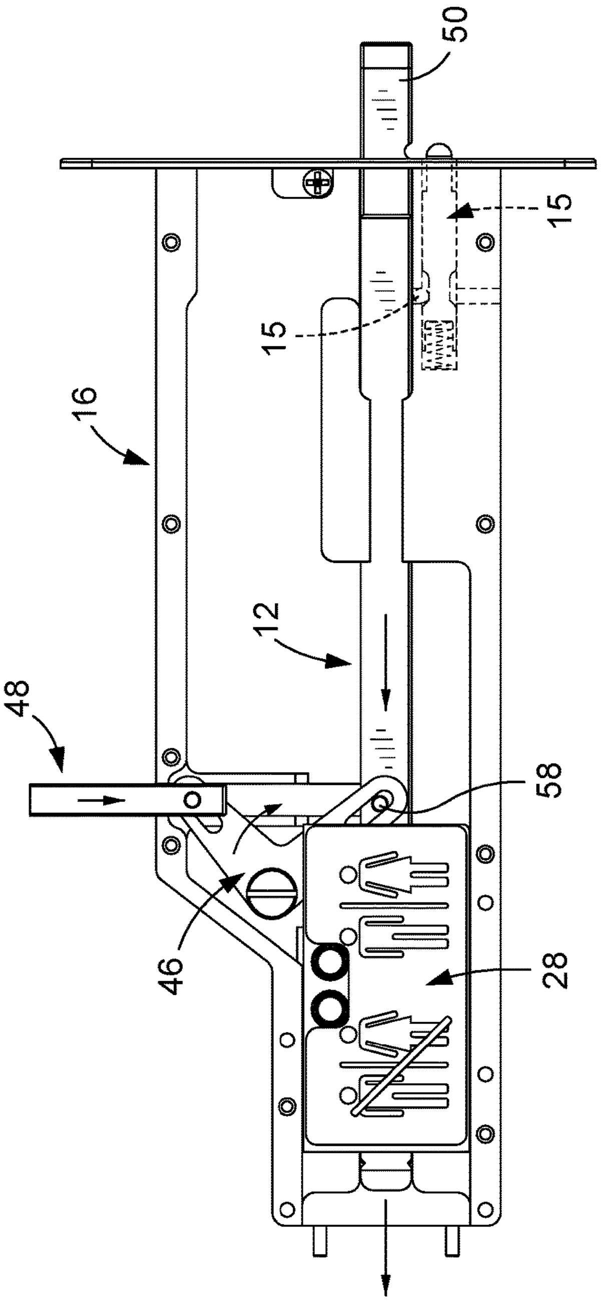
FIG. 10 is a side view of the door locking mechanism with an outer plate removed therefrom to illustrate internal components of the door locking mechanism in the lock configuration.

As the door is closed, the exposed portion of the trigger 15 contacts the door frame, with continued movement of the door toward the closed position causing the trigger 15 to be pressed into the main body 14 by the door frame. When the door is completely closed, the trigger 15 assumes its retracted position within the main body 14, which aligns the intermediate portion 90 of the trigger 15 with the ball lock 84, thereby allowing the ball lock to fall out of the recess 96 of the slide lock 12 and into a void defined by the intermediate portion 90 and the main body 14. Thus, with the ball lock 84 having been vacated from the recess 96, the slide lock 12 is free to transition from the unlocked position toward the locked position (see FIG. 10) using either the handle 24 connected to the slide lock 12, or a separate handle connected to the auxiliary slide mechanism 48, as described in more detail above. When the slide lock 12 is in the locked position, the occupied/unoccupied sign 28 may be positioned relative to the window opening 26 with the occupied indicia on the sign 28 being exposed, and the unoccupied indicia on the sign 28 being concealed by the main body 14.

When a user wants to open the door, the user may move the slide lock 12 from the locked position toward the unlocked position, using either the handle 24 connected to the slide lock 12, or a separate handle connected to the auxiliary slide mechanism 48, which causes the portion of the slide lock 12 that is extended out of the main body 14 to now retreat back into the main body 14. The motion continues until the recess 96 is aligned with the ball lock 84, which may be associated with the position of the grooves 62 and detents 64. With the slide lock 12 now in the unlocked position, the user is able to move the door toward its open position, which moves the trigger 15 away from the door frame. When the trigger is clear of the door frame, the spring 94 acting on the trigger 15 may urge the trigger 15 toward its extended position. As the trigger 15 moves to the extended position, the ball lock 84 rides along the trigger 15 from the intermediate portion 90, up a ramp, and onto a distal portion 92. Due to the configuration of the distal portion 92, the ball lock 84 is raised or moved into the recess 96 on the slide lock 12 to once again inhibit movement of the slide lock out of the unlocked position.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A door locking mechanism comprising:

a main body;

a trigger coupled to the main body and moveable relative to the main body between an extended position and a retracted position, the trigger including a pair of enlarged portions and an intermediate portion between the pair of enlarged portions, the intermediate portion having a cross sectional dimension less than a cross sectional dimension of each of the pair of enlarged portions, the trigger and the main body being configured such that at least a portion of the trigger extends outside of the main body when the trigger is in the extended position, and the trigger being advanced into the main body as the trigger transitions from the extended position toward the retracted position;

a slide lock coupled to the main body and moveable relative to the main body between a locked position and an unlocked position, the slide lock and the main body being configured such that at least a portion of the slide lock extends outside of the main body when the slide lock is in the locked position, and the slide lock being advanced into the main body as the slide lock transitions from the locked position toward the unlocked position; and a ball lock in operative communication with the trigger and the slide lock, the ball lock, the trigger, and the slide lock being configured such that when the trigger is in the extended position, the ball lock inhibits movement of the slide lock from the unlocked position toward the locked position, and movement of the trigger from the extended position toward the retracted position allows the ball lock to assume an unobstructed position which allows the slide lock to transition from the unlocked position toward the locked position;

wherein when the slide lock is in the unlocked position, the ball lock is captured within a recess formed in the slide lock and extends between the slide lock and one of the pair of enlarged portions;

wherein transition of the trigger from the extended position to the retracted position moves the intermediate portion into alignment with the ball lock, allowing the ball lock to move out of the recess.

2. The door locking mechanism recited in claim 1, further comprising an auxiliary slide mechanism configured to be moveable relative to the main body in a direction that differs from movement of the slide lock relative to the main body.

3. The door locking mechanism recited in claim 2, wherein the auxiliary slide mechanism is moveable relative to the main body generally perpendicular to movement of the slide lock relative to the main body.

4. The door locking mechanism recited in claim 2, further comprising a pivot body pivotally connected to the main body and interconnected to the slide lock and the auxiliary slide mechanism.

5. The door locking mechanism recited in claim 4, wherein the pivot body includes a first slot and the slide lock includes a first pin configured to move within the first slot as the slide lock moves relative to the pivot body.

6. The door locking mechanism recited in claim 5, wherein the pivot body includes a second slot, separate from the first slot, and the auxiliary slide mechanism includes a second pin configured to move within the second slot as the auxiliary slide mechanism moves relative to the pivot body.

7. The door locking mechanism recited in claim 1, further comprising a spring positioned so as to act on the trigger to bias the trigger toward the extended position.

8. The door locking mechanism recited in claim 1, wherein the slide lock includes a first edge adjacent the trigger and a recess extending into the slide lock from the first edge, the recess being complementary in shape to an outer periphery of the ball lock such that the ball lock is receivable within the recess when the slide lock is in the unlocked position.

9. The door locking mechanism recited in claim 1, further comprising a handle connected to the slide lock.

* * * * *